United States Patent

[11] 3,560,753

| [72] | Inventors | Lorenz Beug |
| | | Munich; |
| | | Rolf Maier, Grafing, Germany |
| [21] | Appl. No. | 781,118 |
| [22] | Filed | Dec. 4, 1968 |
| [45] | Patented | Feb. 2, 1971 |
| [73] | Assignee | Messerschmitt-Bolkow GmbH |
| | | Munich, Germany |
| [32] | Priority | Dec. 16, 1967 |
| [33] | | Germany |
| [31] | | 1,658,721 |

[54] METHOD AND APPARATUS FOR DETERMINING THE DISPLACEMENT OF A CONSTRUCTION EQUIPMENT GUIDED ALONG A DESIRED COURSE BY A LASER BEAM
17 Claims, 6 Drawing Figs.

[52] U.S. Cl. ........................................... 250/215,
250/236, 172/2, 299/1
[51] Int. Cl. ......................................... E21c 29/00
[50] Field of Search........................................ 250/215,
203, 236, 217; 1/224, 222; 37/(AC), (AL),
(SAL); 172/4.5, 2; 356/4, 16; 299/1

[56] References Cited
UNITED STATES PATENTS
| 3,026,630 | 3/1962 | Hayner et al. | 37/156 |
| 3,126,653 | 3/1964 | Bourgeous | 37/108 |
| 3,297,395 | 1/1967 | Dardarian | 250/203X |
| 3,321,248 | 5/1967 | Williamson et al. | 299/1 |

*Primary Examiner*—Walter Stolwein
*Attorney*—McGlew and Toren

ABSTRACT: In a method for determining the displacement of a construction equipment, to be guided along a desired course by a laser beam, the laser beam is so deflected, depending upon the route to be constructed, that the respective location of the construction equipment transversely of the route is determined, in elevation and traverse, on a projection surface on the construction equipment. The laser beam is transmitted from a determined transmitting point on the route, and is received at a receiving point on the construction equipment in advance of the projection surface. The laser beam is optically deflected, relative to the desired course, at the transmitting point, and along the desired course, at the receiving point, in accordance with a set program based on the desired course and the respective location of the construction equipment. This determines any deviation of the receiving point, and thus of the construction equipment, relative to the desired course. The direction of the beam, as deflected at the receiving point, is compared with the direction of the line of action of the construction equipment to determine any angular deviation of the line of action relative to the desired course.

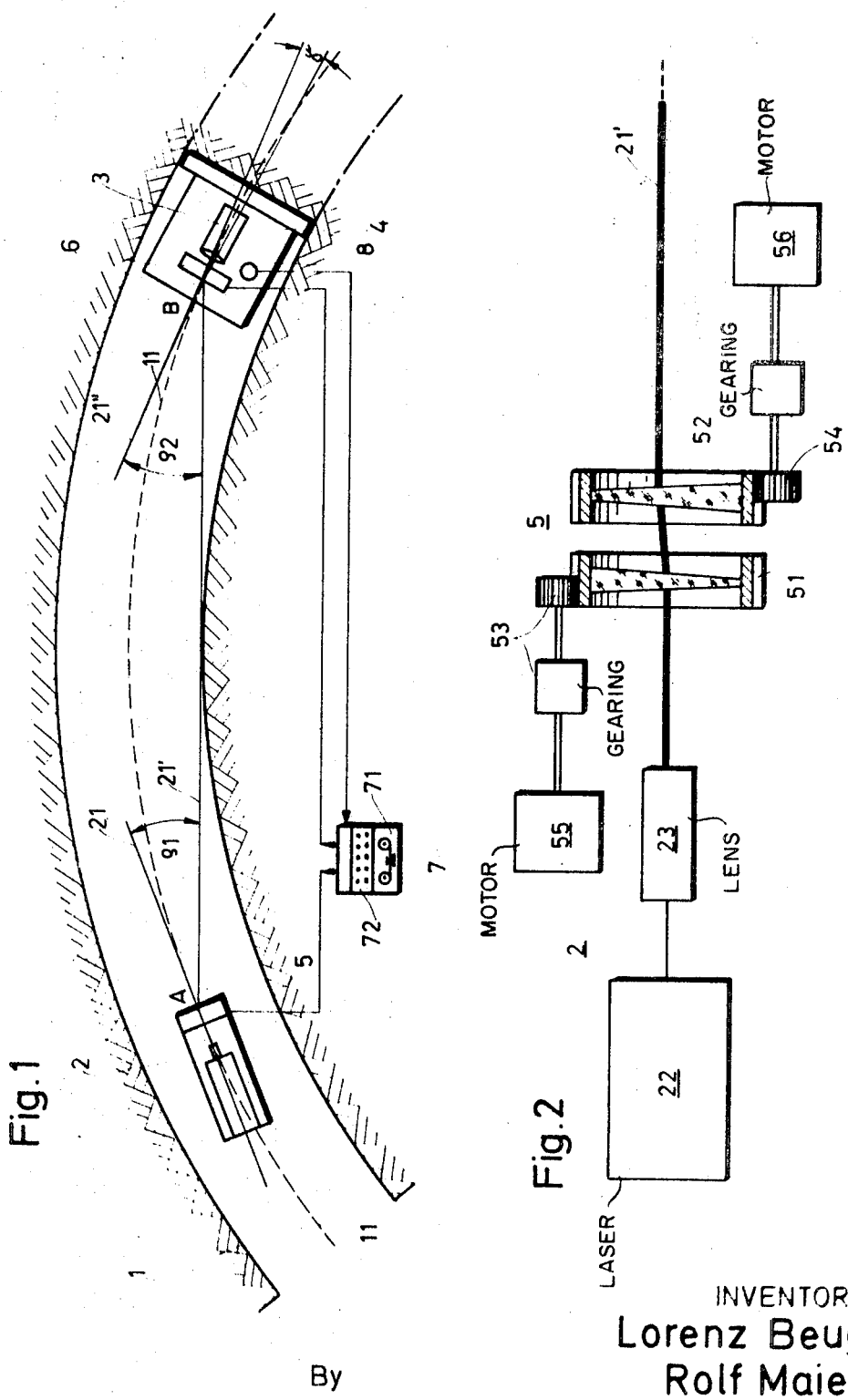

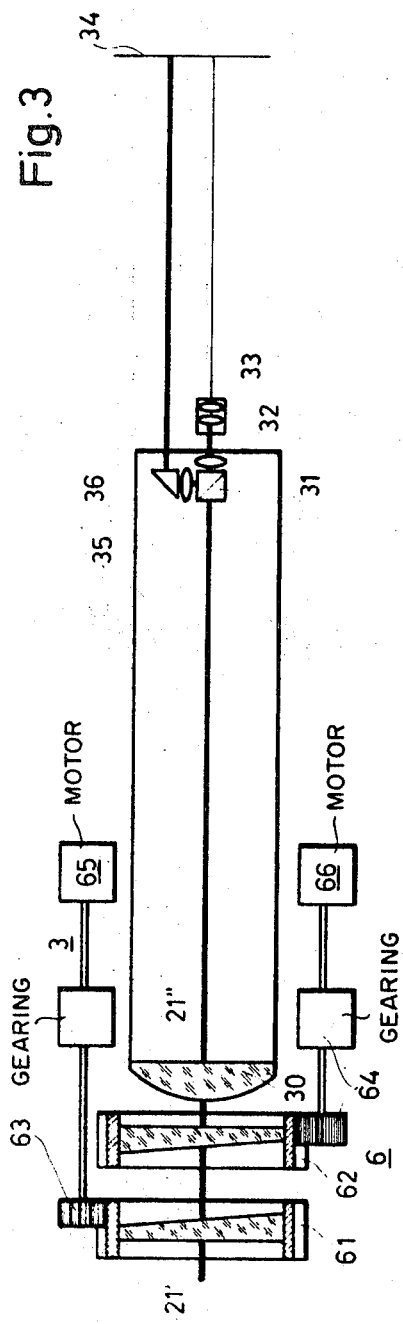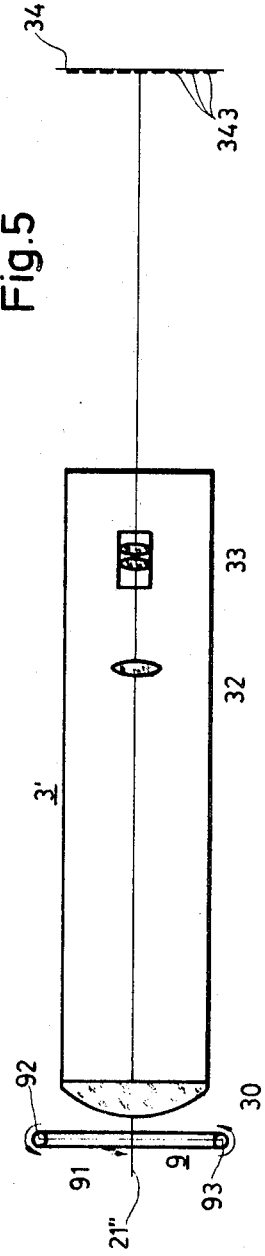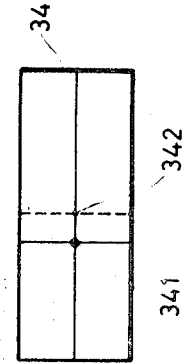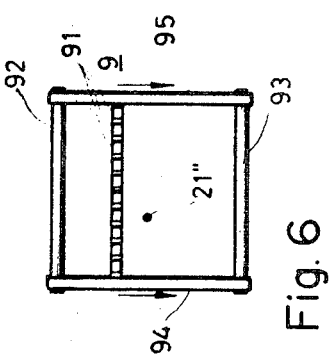
INVENTORS
Lorenz Beug
Rolf Maier

METHOD AND APPARATUS FOR DETERMINING THE DISPLACEMENT OF A CONSTRUCTION EQUIPMENT GUIDED ALONG A DESIRED COURSE BY A LASER BEAM

BACKGROUND OF THE INVENTION

Methods for determining the displacement or location of a construction equipment, for example, of a mechanical shield or a similar excavating machine used in tunnel building, and involving the use of a laser beam, are already known (see IEEE Spectrum, for May 1966, pp. 124 and 126.) In such a known method, a laser is placed at a certain distance behind a tunnel-building machine designed as a shield, and is so adjusted that its beam coincides with the axis of the route or extends at a fixed distance parallel to such axis. There is provided, on the shield, a projection surface with a graduation or with photoelectric cells arranged in a suitable manner, and on which the laser beam reproduces a light spot. This light spot moves, in dependence on the position of the shield relative to the axis of the desired course, in traverse and elevation, from a nominal position, represented on the projection surface and at which the light spot of the laser beam appears when the shield is exactly on the axis of the desired course.

This known method is relatively simple to realize in practice, but is scarcely useable for the construction of curved routes or tunnel zones, since such construction requires a continuous traverse of the laser which is mounted, together with a theodolite, for rotation on a base. An automatic or semiautomatic control of the respective correct location of the shield relative to the given level of the course or of the axis of the tunnel is scarcely possible by this method, or at least can be effected only at a considerable expense, since only the respective deviation of the shield relative to the axis of the course can be determined by means of such a traverse of the laser journaled on the base. An indication of the deviation alone, however, is not sufficient for an accurate control of the shield along the course, because the tendency of the shield to move off the axis of the course can be determined only when a finite deviation value appears.

SUMMARY OF THE INVENTION

This invention relates to the guiding or a construction equipment along a desired course or route by means of a laser beam and, more particularly, to an improved method and apparatus for this purpose and capable of determining not only deviations of the construction equipment relative to the course but also angular deviations of the line of action of the construction equipment relative to the course or route.

In accordance with the invention, an improved method is provided capable of determining exactly not only the displacement or location of a construction equipment relative to a nominal position on a course, but also effecting such exact determination even on curved courses or routes, and on the bases of semiautomatic or fully automatic measurements.

The invention is based on a method for determining the displacement of a construction equipment, to be guided along a desired course by a laser beam which is so deflected, depending upon the route to be constructed, that the respective location of the construction equipment transversely of the route can be determined, in elevation and traverse, on a projection surface on the construction equipment. In accordance with the invention, the deflection of the laser beam is effected optically in accordance with a set program based on the desired course and the respective location of the construction equipment. The optical deflection is effected simultaneously both at a transmitting point on the course and at a receiving point on the construction equipment in advance of the projection surface. Apart from indicating any deviation of the receiving point, and thus of the construction equipment, relative to the desired course, any tendency of the construction equipment to deviate angularly, from a nominal position and a nominal direction on the course, is determined, utilizing the laser beam incident at the receiving point, by means determining the angle between the laser beam, as deflected at the receiving point along the course, and the driving direction or line of action of the construction equipment.

Due to the optical deflection of the laser beam, relative to the axis of the desired course, at the transmitting point and, along the desired course, at the receiving point, on the construction equipment immediately ahead of the projection surface, and which is fixedly mounted on the construction equipment, it is possible to determine the angle between the line of action or longitudinal axis of the construction equipment and the axis of the course or route to be constructed. The laser beam is deflected, at the transmitting point and by means of optical deflection, from a direction tangential to the axis of the course so that it intersects the axis of the course, at the respective location of the construction equipment, on a chord of the circle of curvature of the course. At this intersection, there is arranged the receiving device on the construction equipment, and a receiving device optically deflects a laser beam, coming from the direction of the chord, to the direction of the tunnel axis.

Since the dimensions of the desired course are given, the transmitting point, which is the location of the transmitter emitting the laser beam is known, and the respective location of the construction equipment along the course to be established can be determined with sufficient accuracy, the optical deflection angles of the laser beam, at the transmitting point and at the receiving point, can be determined on the basis of the route or course to be established. If deflection angles thus determined are given for each individual location of the construction equipment along the route, the construction equipment to be controlled is in correct position when it is so controlled that any displacements indicated on the projection surface become zero.

By means of the double optical deflection of the laser beam, which thus coincides again with the axis of the course at the location of the construction equipment, even with a curved line, it is further possible to determine, apart from determining the instantaneous deviation of the construction equipment from the axis of the course, which latter can be simply determined by the point where the laser beam strikes a projection surface connected with the construction equipment, the angular deviation of the construction equipment from the axis of the desired course. This is effected by determining the angle between the laser beam, as deflected back, at the receiving point, in the direction of the course, and the optical axis of the receiving device, which is arranged at least parallel to the driving axis or line of action of the construction equipment. By means of this directional deviation, it is then possible to determine any existing tendency of the construction equipment to move away from the desired course, even when the receiving device, and thus the working surface of the construction equipment, are exactly on the course to be established, so that the indication of the instantaneous deviation is still zero.

Since, during operation of construction equipment, rotation about a desired line of action cannot be avoided in many types of construction equipment, particularly in shield driving machines used to an increasing extent in tunnel construction, and since the receiving device for the laser beam on such construction equipment cannot be arranged, in most cases, so that it coincides with the longitudinal axis of line of action of the construction equipment, such rotation of the construction equipment would affect the accuracy of the determination of the deviation, in the absence of special measures.

In accordance with a further feature of the invention, it is therefore arranged to take into account corrective values at both the transmitting and receiving points, to compensate rotation about the longitudinal axis, during deflection of the laser beam, appearing in construction equipments and while the construction equipments are operating.

With a preferred embodiment of the method, the deflection of the laser beam is effected by optical means connected with adjusting members which are under the influence of a central control device to which the program is fed by hand or by a record carrier, depending ton the respective location of a construction equipment. In accordance with this preferred embodiment of the method, the laser beam can be deflected simply, at the transmitting points and at the receiving points, by remote control and through a certain angle which depends on the respective location of the construction equipment along the route to be constructed. In the simplest case, the size of this angle, which depends on the location of the construction equipment, is fed into the central control device, for example, as numerical values taken from the construction plans of the route, over a keyboard, or by being fed in by a record carrier which can be read directly by the control device and which contains a program set up in correspondence with the desired course to be constructed.

In accordance with another feature of the invention, the record carrier, contained in the program, is scanned by the central device in accordance with a respective location reached by the construction equipment and in dependence on the respective automatically determined deviation of the line of action of the construction equipment, so that the stored corrective values are automatically taken into account.

By means of this further feature, the corrective values, which must be taken into account on the basis of rotation of the construction equipment relative to the desired line of action, are also read directly from the record carrier. On this record carrier, there are stored a number of corrected values, subdivided in any desired way, of which one is selected, depending on the angular deviation of the construction equipment measured automatically by the control device, and taken into account in the deflection of the laser beam. The respective location of the construction equipment along the course or route to be established can be taken into account both by manual keying into the central control device and by automatic determination of the respective location of the construction equipment, along the desired route, by the control device.

In accordance with another embodiment of the method of the invention, the deviation, the angular deviation, or both, of the construction equipment relative to the course or route, indicated by the image of the laser beam, are transformed, by means of electrical photosensitive elements, into electrical deviation signals. THese signals are used for the remote indication of the deviation and the angular deviation, or the direct control of the construction equipment, or both. Such a transformation of optical deviation signals into electrical deviation signals, which is known per se, permits the remote indication, at any point, of the respective determined deviations, or permits the direct control of the construction equipment with the interposition of also known regulating devices.

Apparatus for carrying out the invention method comprises a receiver fixedly connected with the construction equipment, devices for determining the deviation of the image of the laser beam from at least one nominal position, optical deflecting devices for the laser beam individually associated with the transmitter and the receiver, and a central control device which determines, through adjusting members associated with the deflecting devices, the respective position of the deflecting devices in accordance with information fed to the control device.

In accordance with a preferred embodiment of the apparatus, the optical means are glass wedges and the adjusting members are digitally controlled step motors which rotate the glass wedges of each deflecting device through suitable gears, either in opposite directions or in the same direction, so that a solid deflection angle for the laser beam, which is determined as to size and direction by a digital signal, can be set both at the transmitting point and at the receiving point. In accordance with a further feature, the digital signals are stored on a record carrier which is scanned by the central control device.

The receiving device, in accordance with another feature of the invention, has optical means which reproduce the laser beam, deflected by means of the glass wedges along the direction of the desired course or route, on two separate indicator surfaces in such a way that the first surface shows a deviation of the construction equipment and the second surface the directional deviation of the line of action of the construction equipment as given by the angle formed between the laser beam, deflected along the course or route to be followed, and the optical axis of the receiving device. This optical means may comprise a beam splitter, wherein one beam is used to indicate the positional deviation and the other beam to indicate the angular deviation of the construction equipment. The two indicator surfaces may have coordinate divisions to determine the deviations of the laser images from nominal positions, or at least one of the two indicator surfaces may have photosensitive elements for the production of electrical deviation signals corresponding to the deviations.

The method and apparatus of the invention, for determining the displacement of the construction equipment to be guided along a course or route by means of a laser beam, can be used principally for all possible routes or courses to be established underground or above ground, or in track-tamping machines for maintaining predetermined levels. However, the method and apparatus have a particular advantage when used with courses to be established in underground shield operation, as is necessary particularly in recent times in the construction of tunnels or tubes under built-up areas, for building roads and for mass transportation.

An object of the invention is to determine automatically, even with construction machines to be guided along curved lines, not only the positional deviation but also any existing tendency to positional deviation of a construction equipment relative to the axis of a course or route to be followed.

Another object of the invention is to maintain the maximum possible values of such deviations at a minimum during the control of the construction equipment.

A further object of the invention is to provide apparatus for carrying out the method and which involves very simple means for fully automatic determination and indication of the respective deviation values of the construction equipment relative to the desired course or route.

Another object of the invention is to provide a fully aUtomatic control of the construction equipment by means of known regulating devices and responsive to the deviation signals.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a somewhat schematic sectional plan view illustrating the principal features of apparatus for performing the invention method in the construction of a curved underground tunnel or tube;

FIG. 2 is a somewhat schematic plan or elevation view of the principal components of the transmitter;

FIG. 3 is a similar view of the receiver;

FIG. 4 is an elevation view of a projection surface for indicating the deviation signals;

FIG. 5 is a side elevation view of a different form of receiver particularly for transforming optical deviation signals into electrical deviation signals; and FIG. 6 is a left end elevation view of the receiver shown in FIG. 5.

DESCRIPTION OF THE PREFERRED EMBODIMENT

Referring first to FIG. 1, a route, course, or line to be build is indicated at 1 as having arranged thereon, at a transmitting point A, a transmitter 2 and, at a receiving point B, a receiver 3. Receiving point B is determined by the respective location, along course or route 1, of a shield-driving machine 4.

At transmitting point A, transmitter 2 is fixedly mounted for example, on the roof (not represented) of tunnel tube 1 and in such a manner that laser beam 21 emitted by the transistor forms, at transmitting point A a tangent to the curved axis 11 of the course or route. To make certain that laser beam 21 can reach receiver 3 despite the curvature of axis 11, beam 21 is deflected by means of an optical deflecting device 5, by an angle $\rho1$, which has a value such that the deflected laser beam 21' reaches receiver 3 exactly at the respective location B of the shield driving machine 4. A deflecting device 6 is arranged in advance of receiver 3, and deflects laser beam 21', arriving at receiver 3 along a chord of curved axis 11, by an angle $\rho2$, in such a way that a laser beam 21" is formed. Laser beam 21" represents, at receiving point B, a tangent to curved axis 11.

The two angles $\rho1$ and $\rho2$, can be calculated from the known location A of transmitter 2, the given dimensions of the line or route to be built, and the respective position B of shield-driving machine 4 along line 1, to be determined at intervals with sufficient accuracy. For a larger working section, where the location A remains unchanged, these angles are supplied to deflecting devices 5 and 6 as setting values in dependence on the respective position B attained by the construction equipment or shield-driving machine 4. Deflecting devices 5 and 6 are remotely controlled by a common central control device 7, which has a storage 71, for scanning a record carrier, or a keyboard 72, for example, for the numerical feeding of setting values for the deflecting devices. A control device equivalent to the control device 7 is described, for example, in Bourgeous U.S. Pat. No. 3,126,650, column 5, lines 23—51. The record carriers scanned by storage 71 contain all the setting values required for the corresponding working section, and which determine the angles $\rho1$ and $\rho2$. These setting values are scanned in correspondence with the respective position reached by shield-driving machine 4. However, if the setting values for the deflecting devices should be put in manually through the keyboard 72, these setting values can be taken, for example, as numerical values, from a blueprint available for the respective section of the line. These numerical values are determined in advance on the basis of simple trigonometric calculations. Such a procedure is described, for example, in Bourgeous U.S. Pat. No. 3,126,653, column 5, lines 3—51, and is illustrated in FIGS. 16—19 of this Bourgeous patent.

Since deviations about the longitudinal axis appear in such shield-driving machines during operations, these will always manifest themselves as indicating errors when the optical axis of receiver 3 does not coincide with the longitudinal axis of shield-driving machine 4, which will practically always be the case, for constructional reasons. In order to eliminate these undesired influences, a device 8 is provided on the shield-driving machine 4 and determines the respective rotation of the shield about the longitudinal axis, for example by means of a plumb. The values determined by device 8 also are supplied to central control device 7, where they are used as additional parameters for the scanning of the record carrier. Thus, any number of finely subdivided corrective values can be provided on the record carrier, each of which is associated with a certain angular rotation value of the shield. When a certain angular rotation value arrives from device 8, a certain corrective value will therefore be selected on the record support and will be fed, in addition to the setting values, to the deflecting devices 5 and 6 so that the angles $\rho1$ and $\rho2$ will be corrected according to the momentary rotation of the shield.

Referring to FIG. 2, illustrating transmitter 2, this transmitter consists preferably of a gas laser 22, a lens 23 effecting widening of the laser beam, and deflecting device 5. Device 5 has two glass wedges 51 and 52 rotatable relative to each other, and connected over respective gearing 53 and 54 with respective adjusting step motors 55 and 56. By means of motors 55 and 56, which preferably are controlled digitally by control device 7, shown in FIG. 1, glass wedges 51 and 52 can be turned either in opposite directions or in the same direction, so that laser beam 21 can be deflected through a solid angle of any size or direction.

Referring now to FIG. 3, a first embodiment of receiver 3 deflects laser beam 21", as illustrated in FIG. 1, through an objective lens 30, a beam-splitting prism 31, a collecting lens 32 and an additional imaging system 33. The deflection is effected in such a manner that all laser beams 21" incident parallel to the optical axis of receiver 3 are reproduced as an extension of this optical axis, on a projection surface 34, while all laser beams 21" incident at a finite angle with respect to the optical axis, are reproduced displaced from the direction of the optical axis.

A beam deflected from beam-splitting prism 31 is directed through an additional lens 35 and deflected by a prism 36, as an additional beam displaced laterally and parallel to the optical axis of receiver 3. This additional beam also forms an image on projection surface 34, with the image being displaced from a zero point, corresponding to the center of the optical axis, by a deviation in magnitude and direction, even though laser beam 21", deflected by device 6 in the direction of the course or route, does not strike objective lens 30 at its optical axis but rather is displaced from the optical axis by a certain amount. This image of the laser beam, indicating the respective deviation of the receiver 3 and thus also of the shield-driving machine 4 from the axis 11 of the course or route, can also be produced principally directly behind deflecting device 6 and thus, for example, in the plane of the objective lens 30, where the respective deviation can be read directly by the movement of the laser beam from a nominal or zero position. The reproduction on a common projection surface 34, together with the respective directional deviation, results, however, in a clearer recognition of the respective location of shield-driving machine 4 and thus results in a simpler control of machine 4.

Directly in front of receiver 3, there is arranged deflecting device 6, which, like deflecting device 5 of transmitter 2, also comprises two glass wedges 61 and 62 associated with respective adjusting or stepping motors 65 and 66 which rotate the associated glass wedges 61 and 62 through respective gearing indicated at 63 and 64. Again, the rotation of the glass wedges may be either in the same direction or in opposite directions, depending upon the setting values.

FIG. 4 illustrates the projection surface 34 of FIG. 3, and it will be noted that projection surface 34 has a first coordinate system 341 for determining the positional deviation of the construction equipment, relative to the desired course or route, by determining the respective migration of the laser image, in magnitude and direction, from a zero position. A second coordinate system 342 indicates the angular deviation of the line of action or direction of the construction equipment relative to the axis of the route or course to be followed. This is effected by an image of the laser beam, having a smaller circumference, and also moving, in magnitude and direction, from a zero position of coordinate system 342 in accordance with the angular deviation (see FIG. 1).

FIG. 5 illustrates another embodiment of a receiver 3', which again includes objective lens 30, a collecting lens 32 and an imaging system 33, to deflect a laser beam 21"', displaced in direction with respect to the optical axis, also from the zero point of projection surface 34. The optical means for determining the positional deviation of the construction equipment with respect to the axis of the course or route are thus, in the embodiment of FIG. 5, the same as in the embodiment of FIG. 3.

In FIG. 5, an additional scanning device 9 is provided directly in front of receiver 3'. Device 9 comprises a horizontal bar carrying photocells 91, and this bar is movable cyclically up and down in front of the inlet opening of receiver 3. As shown more in detail in FIG. 6, the bar carries a number of photocells 91 by means of which the deflection of the laser beam, arriving at receiver 3', in a horizontal direction from the optical axis can be determined. The deflection of the laser beam in a vertical direction from the optical axis can be determined by the respective position of the bar carrying photocells 91 when this bar is reciprocated vertically in the plane of incidence of the laser beam in front of receiver 3'. The bar mounting photocells 91 can be driven, for example, and as represented schematically, through rollers 92 and 93 and endless belts 94 and 95, through the medium of a motor (not shown). However, the respective linewise position of the bar carrying photocells 91 must be determinable.

The embodiment of the invention shown in FIGS. 5 and 6 has the advantage that the deviation of the position of a construction equipment from the axis of the desired course or route to be followed is obtained directly as an electrical deviation signal, while the laser beam, entering the receiver, is interrupted only briefly for measuring this deviation. Thus, there appears, with a corresponding rapid movement of the bar carrying photocells 91, a still picture or image on on projection surface 34 for determining the displacement of the construction equipment relative to the desired axis of the course or route. On projection surface 34, there can also be arranged individual photocells 343 in a suitable manner, for example, in rows or columns, and these can be used to determine the angular deviation of the line of action or longitudinal axis of the construction equipment, relative to the desired course or route to be followed, directly as an electrical deviation signal.

Receivers 3 or 3' must be installed on the shield-driving machine 4 in a manner such that the optical axis of the receiver is at least parallel to the longitudinal centerline or line of action of shield 4. The center of the receiving surface, and thus the intersection of the optical axis of the receiver, with the objective lens 30, must form the point at which the laser beam impinges when the line of action of the shield coincides exactly with the axis 11 of the desired course or route 1, or forms an intersection therewith. If the two axes coincide, both the positional deviation and the angular deviation of shield 4 are zero. However, if the two axes form an intersection, the positional deviation is zero but the angular deviation of the line of action of shield 4 is not zero. In this case, there is a tendency of the shield to diverge from the axis of the desired line or course upon further operation of the construction equipment and thus to produce a finite deviation of the shield relative to the axis.

THe optical imaging systems of the receivers 3 and 3' are so designed that a correct imaging of the laser beam, in traverse and elevation is attained on projection surface 34. Thus, when the shield is displaced, for example, to the right and down with respect to the desired course or route, the punctiform laser image on projection surface 34 is likewise displaced to the right and down from the zero position. By means of the second optical path, which is separated from the original optical path by the prisms 31 and 36, the point of impingement of the laser beam on objective lens 30 is indicated on projection surface 34 in reverse traverse and elevation, independently of the respective positions of glass wedges 61 and 62. Thus, one viewing projection surface 34 always sees a correct representation of the position of the shield if one imagines that the punctiform image of the laser beam indicates the shield and the zero point of the coordinate system associated with this image indicates the axis of the course or route to be followed.

Before the start of construction of a new section, transmitter 2 is mounted in position, for example, on the tunnel roof, and so aligned in a predetermined direction that its deflected beam extends in the direction of the course or route to be constructed. Since the individual locations of shield-driving machine 4 can be determined with sufficient accuracy, at small intervals along the course or route, certain deflection angles $p1$ and $p2$ for the laser beam can be calculated for these various locations of the shield-driving machine, and for the transmitter and also the receiver, the angles depending on the curvature of the line to be constructed. These calculated values can then be fed either individually, by hand, or jointly, for at least one sector of a fixed program stored on a record carrier, to the central control device 7 in the manner described above. Since any solid angles can be set accurately, in magnitude and direction, with the deflecting devices 5 and 6, a curvature of the course or route in both a vertical and a horizontal direction can be handled and the production of the curved section can be supervised by means of the invention method.

If, in addition to the central control device programmed by means of a record carrier, the deviations of the construction equipment are indicated directly as electrical deviation signals, a fully automatic control of the construction equipment can be effected, using these electrical deviation signals, by known regulating means. The operating personnel merely has to supervise, in this case, the fully automatic plant, for correct operation during a full construction period for which a common fixed transmitting point A has been determined. 28

We claim:

1. A method for determining the displacement of a construction equipment, to be guided along a desired course by a laser beam which is so deflected, depending upon the route to be constructed, that the respective location of the construction equipment transversely of the route can be determined, in elevation and traverse, on a projection surface on the construction equipment: said method comprising the steps of transmitting the laser beam from a determined transmitting point on the route; receiving the laser beam at a receiving point on the construction equipment in advance of the projection surface; optically deflecting the laser beam, relative to the desired course, at the transmitting point, and along the desired course, at the receiving point, in accordance with a set program based on the desired course and the respective location of the construction equipment to determine any deviation of the receiving point, and thus of the construction equipment, relative to the desired course; and comparing the direction of the beam, as deflected at the receiving point, with the direction of the line of action of the construction equipment, to determine any angular deviation of the line of action relative to the desired course.

2. A method, as claimed in claim 1, including the step of taking into account, at both the transmitting point and the receiving point, corrective values for the deflections of the laser beam to compensate rotations of the construction equipment, during operation about its longitudinal axis.

3. A method, as claimed in claim 1, including the step of adjusting the optical deflections of the laser beam from a central point in accordance with programmed values corresponding to locations, along the route, attained by the construction equipment.

4. A method, as claimed in claim 3, including the step of manually adjusting the optical deflections of the laser beam in accordance with the programmed values.

5. A method, as claimed in claim 3, including the step of utilizing a record carrier, on which the programmed values are recorded, to effect the adjustment of the optical deflections of the laser beam.

6. A method, as claimed in claim 5, including adjusting the optical deflections of the laser beam taking into account corrective values compensating for rotation of the construction equipment about its longitudinal axis during operation of the construction equipment; and utilizing the corrective values to modify the programmed values on the record carrier.

7. A method, as claimed in claim 1, including the step of photoelectrically converting the images of the laser beam appearing on the projection surface into electrical deviation signals of the deviation of the construction equipment relative to the desired course and of the angular deviation of the line of action of the construction equipment relative to the desired course.

8. A method, as claimed in claim 7, including utilizing the electrical deviation signals to provide remote indications of the deviation of the construction equipment.

9. A method, as claimed in claim 7, including utilizing the electrical deviation signals to control the operation of the construction equipment.

10. A method, as claimed in claim 1, in which, during the construction of a curved portion of a route, the laser beam, at the transmitting point, is initially directed along the axis of the route and is deflected along a chord of the route to the receiving point; the laser beam at the receiving point being deflected along the axis of the route.

11. Apparatus for determining the displacement of a construction equipment, to be guided along a desired course by a laser beam which is so deflected, depending upon the route to be constructed, that the respective location of the construction equipment transversely of the route can be determined, in elevation and traverse, on a projection surface on the construction equipment: said apparatus comprising, in combination, a laser at a fixed point having known coordinates, said laser being aligned in a predetermined direction with respect to the course to be followed; a receiver fixedly mounted on the construction equipment in advance of the projection surface; means operatively associated with said receiver and operable to determine the deviation of the received laser beam relative to at least one reference position; first optical deflecting devices for the laser beam emitted by the laser; second optical deflecting devices for the laser beam incident at the receiver; respective adjusting members operatively associated with said first and second optical deflecting devices; and a central control device operatively associated with said adjusting members and controlling the first and second deflecting devices in accordance with information supplied to said central control device.

12. Apparatus, as claimed in claim 11, in which each of said optical deflecting devices comprises transparent wedges; the adjusting members associated with each of said first and second optical deflecting devices including respective step motors and respective gearing connecting each motor to its associated optical deflecting device, to rotate the associated transparent wedges in the same or opposite directions; said step motors being digitally controlled by said central control device; whereby a solid deflection angle of the laser beam, determined as to magnitude and direction, can be set by digital signals of said central control device.

13. Apparatus, as claimed in claim 12, in which the information fed to said central control device comprises digital signals on a record carrier scanned by said central control device.

14. Apparatus, as claimed in claim 12, in which the glass wedges of said second optical deflecting device deflect the laser beam, incident at said receiver, along the desired course; and optical means operatively associated with said receiver and reproducing the thus deflected laser beam on two separate indicator surfaces in a manner such that a visual indication of the positional deviation of the construction equipment relative to the desired course appears on a first indicator surface, and a visual indication of the angular deviation of the line of action of the construction equipment relative to the desired course, and represented by the angle formed between the thus deflected laser beam and the optical axis of said receiver, appears on the second indicator surface.

15. Apparatus, as claimed in claim 14, in which said optical means form a beam splitter providing one beam indicating the positional deviation and another beam indicating the angular deviation of the construction equipment.

16. Apparatus, as claimed in claim 15, in which said first and second indicator surfaces have respective sets of coordinates for determining deviations of the laser images from respective reference positions.

17. Apparatus, as claimed in claim 15, including photosensitive elements on at least one of said indicator surfaces and producing deviation signals corresponding to the deviations of the construction equipment.